(12) United States Patent
Lee et al.

(10) Patent No.: US 12,107,264 B2
(45) Date of Patent: Oct. 1, 2024

(54) ANODE ACTIVE MATERIAL COMPRISING METAL PHOSPHIDE COATING ON SURFACE OF CARBON MATERIAL, PREPARATION METHOD THEREFOR, NONAQUEOUS LITHIUM SECONDARY BATTERY COMPRISING ANODE ACTIVE MATERIAL, AND MANUFACTURING METHOD THEREFOR

(71) Applicants: KOREA ELECTROTECHNOLOGY RESEARCH INSTITUTE, Gyeongsangnam-do (KR); UNIVERSITY-INDUSTRY COOPERATION GROUP OF KYUNG HEE UNIVERSITY, Gyeonggi-do (KR)

(72) Inventors: Sang Min Lee, Gyeongsangnam-do (KR); Min-Sik Park, Gyeonggi-do (KR); Chul Ho Lee, Gyeongsangnam-do (KR); Jeong Hee Choi, Busan (KR)

(73) Assignees: KOREA ELECTROTECHNOLOGY RESEARCH INSTITUTE, Gyeongsangnam-Do (KR); UNIVERSITY-INDUSTRY COOPERATION GROUP OF KYUNG HEE UNIVERSITY, Gyeonggi-Do (KR)

( * ) Notice: Subject to any disclaimer, the term of this patent is extended or adjusted under 35 U.S.C. 154(b) by 464 days.

(21) Appl. No.: 17/595,157

(22) PCT Filed: May 13, 2020

(86) PCT No.: PCT/KR2020/006271
§ 371 (c)(1),
(2) Date: Nov. 10, 2021

(87) PCT Pub. No.: WO2020/231169
PCT Pub. Date: Nov. 19, 2020

(65) Prior Publication Data
US 2022/0216462 A1 Jul. 7, 2022

(30) Foreign Application Priority Data

May 13, 2019 (KR) ........................ 10-2019-0055672

(51) Int. Cl.
*H01M 4/36* (2006.01)
*C01B 25/08* (2006.01)
(Continued)

(52) U.S. Cl.
CPC ............. *H01M 4/366* (2013.01); *C01B 25/08* (2013.01); *C01B 32/21* (2017.08); *C01G 39/02* (2013.01);
(Continued)

(58) Field of Classification Search
CPC .......... H01M 4/587; H01M 4/58; H01M 4/04; H01M 4/36; H01M 4/366
See application file for complete search history.

(56) References Cited

U.S. PATENT DOCUMENTS

| 5,091,022 A | 2/1992 | Achikita et al. |
| 2007/0082268 A1* | 4/2007 | Star ........................ H01M 4/04 429/231.95 |
| 2014/0242460 A1* | 8/2014 | Woo ...................... H01M 4/587 429/211 |

FOREIGN PATENT DOCUMENTS

| KR | 10-2013-0063486 A | 6/2013 |
| KR | 10-2015-0103841 A | 9/2015 |
(Continued)

OTHER PUBLICATIONS

Liu, Weili, et al.; "Recent progress in phosphorus based anode materials for lithium/sodum ion batteries", Energy Storage Materials 16 (2019) 290-322.
(Continued)

*Primary Examiner* — Kenneth J Douyette
(74) *Attorney, Agent, or Firm* — Harness, Dickey & Pierce, P.L.C.

(57) ABSTRACT

The present invention provides a method for preparing an anode active material for a nonaqueous lithium secondary battery, comprising the steps of: preparing a carbon-based material; forming a precursor coating layer comprising Me and A (wherein A is O or S) on the surface of the carbon-
(Continued)

based material; supplying a P precursor to the precursor coating layer of the carbon-based material; and converting at least a part of the precursor coating layer into a compound represented by $Me_{x1}P_{y1}$ (wherein x1>0 and y1>0) by the reaction of the precursor coating layer and the P precursor, thereby forming a phosphide coating layer, wherein Me is at least one type of the same metal element selected from among Mo, Ni, Fe, Co, Ti, V, Cr, Nb and Mn.

9 Claims, 18 Drawing Sheets

(51) Int. Cl.
    *C01B 32/21*    (2017.01)
    *C01G 39/02*    (2006.01)
    *H01M 4/58*     (2010.01)
    *H01M 4/587*    (2010.01)
    *H01M 4/02*     (2006.01)

(52) U.S. Cl.
    CPC ......... *H01M 4/5805* (2013.01); *H01M 4/587* (2013.01); *C01P 2002/72* (2013.01); *C01P 2002/85* (2013.01); *C01P 2004/03* (2013.01); *C01P 2004/04* (2013.01); *C01P 2004/60* (2013.01); *C01P 2006/40* (2013.01); *H01M 2004/021* (2013.01); *H01M 2004/027* (2013.01)

(56)         References Cited

FOREIGN PATENT DOCUMENTS

| KR | 10-2016-0038540 A | 4/2016 |
| KR | 10-2016-0059096 A | 5/2016 |
| KR | 10-2019-0054584 A | 5/2019 |
| WO | WO-2010/137753 A1 | 12/2010 |

OTHER PUBLICATIONS

Office Action from corresponding Korean Application No. 10-2019-0055672, dated Nov. 16, 2023.

International Search Report from corresponding PCT Application No. PCT/KR2020/006271, dated Aug. 14, 2020.

* cited by examiner

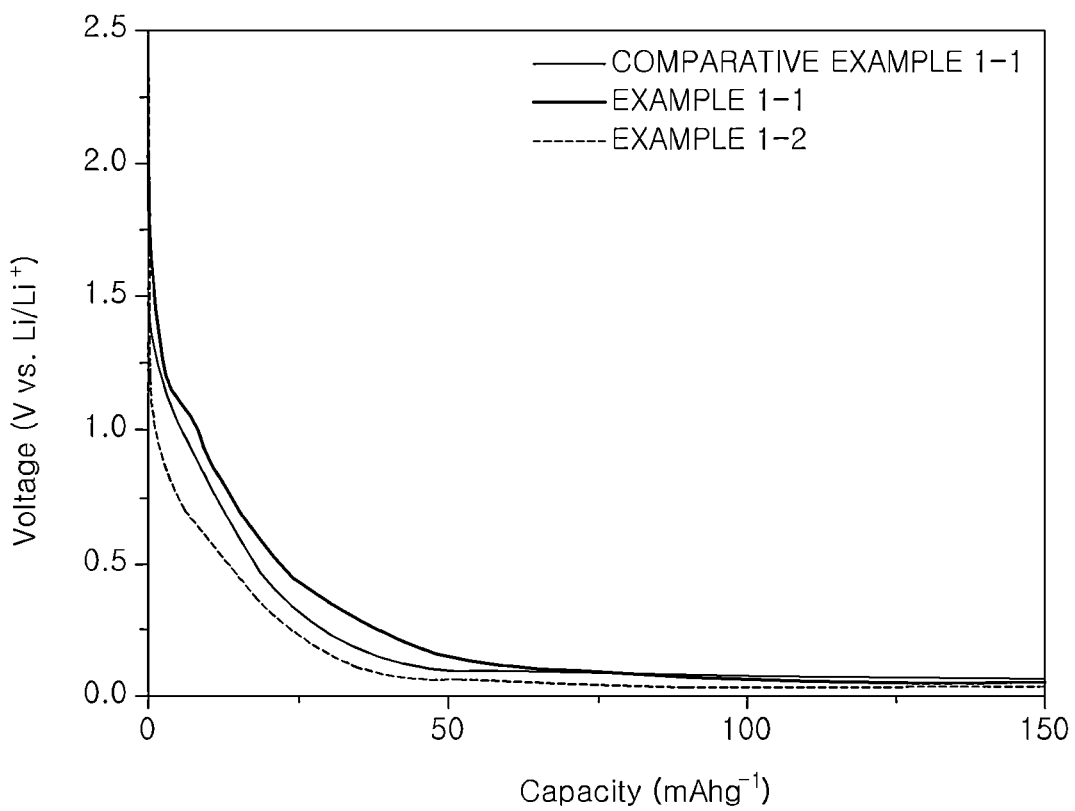

ANODE ACTIVE MATERIAL COMPRISING METAL PHOSPHIDE COATING ON SURFACE OF CARBON MATERIAL, PREPARATION METHOD THEREFOR, NONAQUEOUS LITHIUM SECONDARY BATTERY COMPRISING ANODE ACTIVE MATERIAL, AND MANUFACTURING METHOD THEREFOR

CROSS-REFERENCE TO RELATED APPLICATIONS

This application is a national phase application of PCT Application No. PCT/KR2020/006271, filed on 13 May 2020, which claims priority to Korean Patent Application No. 10-2019-0055672, filed on 13 May 2019. The entire disclosure of the applications identified in this paragraph is incorporated herein by reference.

TECHNICAL FIELD

The present invention relates to a quick charging nonaqueous lithium secondary battery and a manufacturing method therefor and, more specifically, to an anode active material in which a functional coating layer is formed on the surface of a carbon-based material applied as an anode active material of a lithium secondary battery, a nonaqueous lithium secondary battery having the same, and a manufacturing method therefor.

BACKGROUND ART

With the increasing spread of portable small electric and electronic devices, new secondary batteries, such as nickel-hydrogen batteries and lithium secondary batteries, have been being actively developed.

Out of these, lithium secondary batteries use metal lithium as an anode active material and a nonaqueous solvent as an electrolyte. Since lithium is a metal having a high ionization tendency to thereby enable high voltage expression, batteries having a high energy density have been developed. Lithium secondary batteries using lithium metal as an anode active material have been used as next-generation batteries over a long period of time.

When a carbon-based material is applied as an anode active material in such lithium secondary batteries, the decomposition reaction of an electrolyte occurs during charging and discharging since the charge and discharge potential of lithium is lower than the stable range of an existing nonaqueous electrolyte. As a result, a film is formed on the surface of the carbon-based anode active material. That is, the electrolyte is decomposed to form a film on the surface of an electrode before lithium ions are intercalated into the carbon-based material, and this film has a property of passing the lithium ions therethrough but has a property of blocking the movement of electrons. Therefore, once the film is formed, the decomposition of the electrolyte due to the movement of electrons between the electrode and the electrolyte is suppressed and only intercalation and de-intercalation of lithium ions can be selectively conducted. Such a film is called a solid electrolyte interface or solid electrolyte interphase (SEI).

For this reason, the resistance generated on the surface of the carbon-based material in the procedure of intercalating lithium ions into the carbon-based material during charging is very high, so that during high-rate charging, precipitation of lithium metal occurs, which is indicated as a fundamental cause for low charging and discharging efficiency and the deterioration of lifespan characteristics during high-rate charging of a current lithium secondary battery in which a carbon-based material is applied as an anode active material.

In order to solve these problems, methods of improving the mobility of lithium ions through physical or chemical surface modification of a carbon-based anode active material have been proposed so as to secure high-rate charging characteristics of a nonaqueous lithium secondary battery employing a carbon-based material. However, such surface modification can improve the lifespan characteristics, but cannot solve the problems of precipitation of lithium metal and reductions in capacity, high-rate characteristics, and charging and discharging efficiency.

Therefore, studies have been conducted on the formation of a functional coating layer, for reducing the generation of resistance and suppressing the precipitation of lithium metal during high-rate charging, on the surface of a carbon-based material by various methods, but no technology of suppressing the precipitation of lithium metal during high-rate charging has yet been developed.

SUMMARY

Technical Problem

Therefore, the present disclosure has been made in view of the above-mentioned problems, and an aspect of the present invention is to provide an anode active material, which has improved high-rate charging characteristics by forming a coating layer containing a phosphide on the surface of a carbon-based material to reduce the resistance generated during the intercalation of lithium and to improve high-rate charging characteristics through suppression of precipitation of lithium metal and which, when applied as an anode active material for a nonaqueous lithium secondary battery, enables secure high-rate charging characteristics without the deterioration of charging and discharging efficiency and lifespan characteristics.

Another aspect of the present invention is to provide a nonaqueous lithium secondary battery including the aforementioned anode active material.

Still another aspect of the present invention is to provide a method for preparing the aforementioned anode active material.

Solution to Problem

In accordance with an aspect of the present disclosure, there is provided a method for preparing an anode active material for a nonaqueous lithium secondary battery, the method including: preparing a carbon-based material; forming a precursor coating layer containing Me and A (A is O or S) on the surface of the carbon-based material; supplying a P precursor to the precursor coating layer on the carbon-based material; and reacting the precursor coating layer and the P precursor to convert at least a portion of the precursor coating layer into a compound represented by chemical formula $Me_{x1}P_{y1}$ (x1>0 and y1>0), thereby forming a phosphide coating layer, wherein Me is at least one same metal element selected from Mo, Ni, Fe, Co, Ti, V, Cr, Nb, and Mn.

In the present invention, the phosphide coating layer may contain a composite of a compound represented by chemical formula $Me_{x1}P_{y1}$ (x1>0 and y1>0) and a compound represented by chemical formula $Me_{x2}A_{y2}$ (A is O or S; and x2>0 and y2>0).

In the present invention, in the supplying of the P precursor, the P precursor may be supplied as a gas source. Alternatively or additionally, in the supplying of the P precursor, the P precursor may be mixed, as a solid or liquid source, with the carbon-based material.

In the present invention, the P precursor may be at least one type selected from the group consisting of sodium hypophosphite ($NaH_2PO_2$), phosphoric acid ($H_3PO_4$), phosphorous trichloride ($PCl_3$), phosphorous, red (P), Phosphorous, black (P), and triphenyl phosphine ($C_{18}H_{15}P$).

In addition, in the forming of the coating layer, heat treatment may be conducted for reaction of the precursor coating layer and the P precursor.

In addition, in the converting, P of the P precursor may be substituted for A in the precursor coating layer.

In addition, the P precursor may contain no metal element Me.

In addition, the forming of the phosphide coating layer may be performed in an inert gas atmosphere at 500-1000° C. for 1-10 hours.

In accordance with another aspect of the present invention, there is provided an anode active material for a nonaqueous lithium secondary battery, the anode active material including: a carbon-based material; and a coating layer formed on the surface of the carbon-based material and containing a compound represented by chemical formula $Me_{x1}P_{y1}$ (x1>0 and y1>0), wherein Me is at least one same metal element selected from the group consisting of Mo, Ni, Fe, Co, Ti, V, Cr, Nb, and Mn.

In the present invention, Me may include Mo; $Me_{x1}P_{y1}$ may include at least one type from the group consisting of MoP, $MoP_2$, $Mo_3P$, $MoP_4$, $Mo_4P_3$, and $Mo_8P_5$; and $Me_{x2}A_{y2}$ may include at least one type selected from the group consisting of MoO, $MoO_2$, and $MoO_3$. In addition, the anode active material may have distinctive peaks in the vicinity of 2θ=32.0° and 43.0° in an X-ray diffraction pattern. Also, the anode active material may have distinctive peaks in the vicinity of 2θ=23.9°, 29.5°, and 41.7° in an X-ray diffraction pattern.

In addition, the coating layer may further contain a compound represented by chemical formula $Me_{x2}A_{y2}$ (A is O or S; and x2>0 and y2>0).

In addition, Me may include Ni, and $Me_{x1}P_{y1}$ may include at least one type selected from the group consisting of $Ni_5P_2$, $Ni_4P_2$, $Ni_3P$, $Ni_{12}P_5$, $Ni_2P$, $Ni_5P_4$, NiP, $NiP_2$, and $NiP_3$.

In addition, Me may include Fe, and $Me_{x1}P_{y1}$ may include at least one type from the group consisting of FeP, $Fe_2P$, $Fe_3P$, and $Mo_8P_5$.

In addition, Me may include Co, and $Me_{x1}P_{y1}$ may include at least one type from the group consisting of CoP and $Co_2P$.

In the present invention, the coating layer may be uniformly or partially formed on the surface of the carbon-based material.

In addition, the carbon-based material may include at least one type selected from the group consisting of artificial graphite, natural graphite, graphitized carbon fibers, graphitized mesocarbon microbeads, petroleum coke, resin burned bodies, carbon fibers, and pyrolytic carbon.

In the present invention, the carbon-based material may have a particle diameter of 20 μm or less.

Advantageous Effects of Invention

According to the present invention, a $MeP_x$ phase is formed on the surface of a carbon-based material used as an anode active material for a nonaqueous lithium secondary battery, thereby inducing more stable high-rate charging characteristics in the surface of the carbon-based material.

Furthermore, the resistance generated in the surface of the anode active material can be reduced by the surface coating layer, and thus the anode active material, when applied as an anode active material for a nonaqueous lithium secondary battery, can improve high-rate charging characteristics without the deterioration of lifespan characteristics.

BRIEF DESCRIPTION OF THE DRAWINGS

FIGS. 6A and 6B illustrate graphs showing half-cell charge and discharge characteristics of nonaqueous lithium secondary batteries using the anode active materials according to a first exemplary embodiment of the present invention.

DETAILED DESCRIPTION

Figure 1:
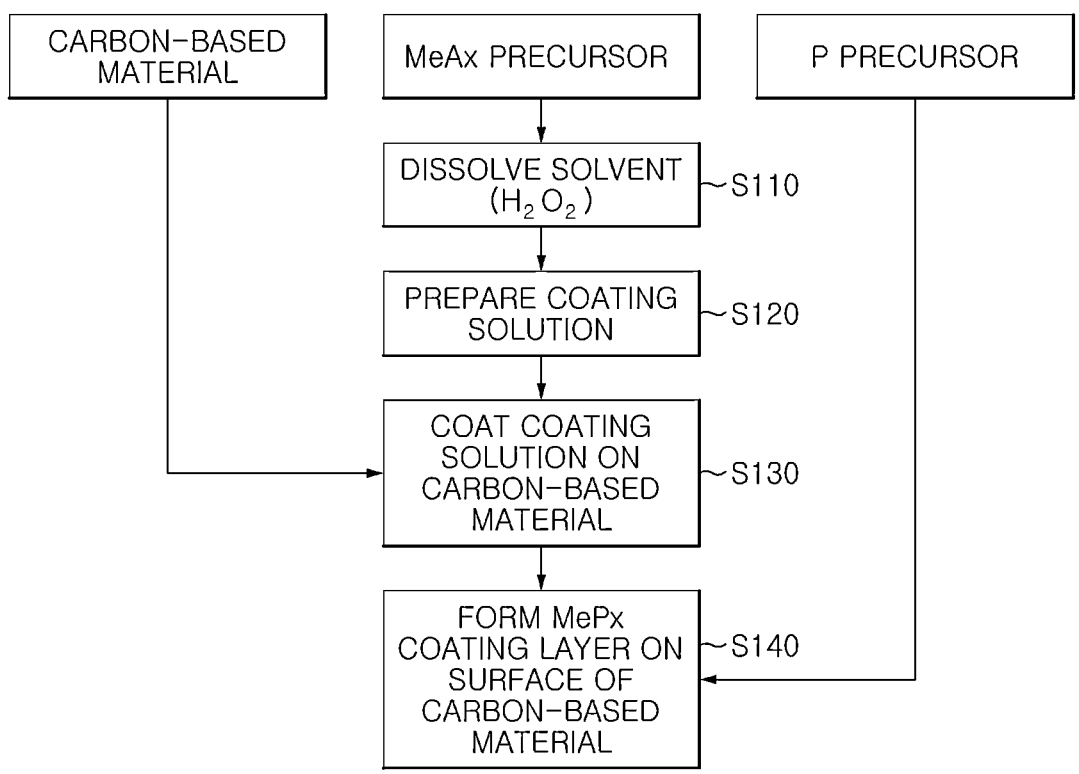
FIG. 1 is a flowchart schematically illustrating a process of preparing an anode active material for a nonaqueous lithium secondary battery, the anode active material having a $MoO_x$ functional coating layer containing molybdenum phosphides ($MoP_x$), such as MoP and $MoP_2$, according to an embodiment of the present invention.

It is to be noted that in the following description, only the parts necessary for understanding exemplary embodiments of the present invention will be described, and descriptions of the other parts will be omitted so as not to deviate from the gist of the present invention.

Hereinafter, exemplary embodiments of the present invention will be described in more detail with reference to the accompanying drawings.

An anode active material for a nonaqueous-based lithium secondary battery according to the present invention includes: a carbon-based material; and a coating layer formed on the surface of the carbon-based material and containing a compound represented by chemical formula $Me_{x1}P_{y1}$ (integers of x1>0 and y1>0, hereinafter $MeP_x$). In the present invention, Me is a transition metal and may preferably include at least one type selected from the group consisting of Mo, Ni, Fe, Co, Ti, V, Cr, Nb, and Mn.

Herein, in some cases, chemical formula $MeA_x$ is expressed as $MeO_x$ for an oxide and $MeS_x$ for a sulfide.

In the present invention, the $Me_{x1}P_{y1}$ compound is derived from a Me-A compound precursor. The $Me_{x1}P_{y1}$ compound reacts with the precursor compound Me-A to convert the precursor into a Me-P compound, and for example, this reaction may result in a form in which A is substituted with P in the Me-A compound.

According to the present invention, the metal element may be derived from a starting material or a precursor.

In the present invention, the $MeP_x$ compound may be a binary compound, such as M1-P (M1 is a transition metal) or a ternary compound, such as M1-M2-P (M1 and M2 are transition metals), or other higher-order compound. In the present invention, M1-P and M1-A may be present as a ternary compound such as M1-A-P.

In the present invention, the $MeP_x$ compound may contain two types of phases having different valences. For example, in cases of Co, at least two types of phases selected from CoP, $Co_2P$, and $CoP_2$ may be present in the Co—P compound. The $MeP_x$ compound may be present in a thermodynamically stable or metastable form.

Similarly, in the present invention, the $MeA_x$ compound is an oxide or sulfide of the same metal as in the $MeP_x$ compound. The $MeA_x$ compound may be a binary compound, a ternary compound, or other higher-order compound. The $MeA_x$ compound may also contain two types of phases having different valences.

In the present invention, exemplary compounds which can be present for an anode active material are shown in the following table.

TABLE 1

| Metal element | Compound |
| --- | --- |
| Mo | MoP, $MoP_2$, $Mo_3P$, $MoP_4$, $Mo_4P_3$, $Mo_8P_5MoO$, $MoO_2$, $MoO_3$, $MoS_2$ |
| Ni | $Ni_5P_2$, $Ni_4P_2$, $Ni_3P$, $Ni_{12}P_5$, $Ni_2P$, $Ni_5P_4$, NiP, $NiP_2$, $NiP_3NiO$, $NiO_2$, $Ni_3S_4$, $Ni_7S_6$, $NiS_2$ |
| Fe | FeP, $Fe_2P$, $Fe_3PFeO$, $Fe_2O_3$, FeS, $Fe_3S$, $FeS_2$ |
| Co | CoP, $Co_2P$, $CoP_2CoO$, $Co_3O_4$, $CoO_2$, $CoS_2$, $Co_4S_3$, $Co_3S_4$, CoS |
| Ti | $Ti_3P$, $Ti_2P$, $Ti_7P$, $Ti_4P_3$, TiP, $Ti_5P$, $Ti_7P_4TiO$, $Ti_2O_3$, $Ti_3O_4$, $TiO_2$, $Ti_3O_2$, $Ti_8S_{10}$, $Ti_8S_9$, $Ti_{16}S_{21}$, $Ti_2S$, $Ti_3S$, $Ti_6S$, $TiS_3$, $TiS_2$, TiS |
| V | $VPV_2O_3$, $V_3O_5$, $V_4O_7$, $V_5O_9$, $V6O_{11}$, $V_7O_{13}$, $V_8O_{15}$, $VO_2$, $V_2O_5$, VS, $VS_2$ |
| Cr | $Cr_2P$, $Cr_3P$, CrP, $CrP_4$, $Cr_{12}P_7$, $CrP_2$, $CrPCr_2O_3$, $Cr_3O_4$, $Cr_2S_3$ |
| Mn | $Mn_3P_2$, $Mn_2P$, MnP, MnO, $Mn_2O_3$, $MnO_2$, $Mn_3O_4$, $Mn_2S_7$, $MnS_2$, MnS |
| Nb | NbPNbO, $NbO_2$, $Nb_2O_5$, $NbS_2$ |

In such a case, a portion of the Me-A compound precursor may be converted into the Me-P compound or the substantially entire portion of the Me-A compound precursor may be converted into the Me-P compound. The remaining Me-A compound may be present as a compound of $Me_{x2}A_{y2}$ (integers of x2>0 and y2>0; and A is O or S, hereinafter $MeA_x$).

In the present invention, the fractions of the $MeA_x$ compound and the $MeP_x$ compound in the coating layer may be determined by a thermodynamic equilibrium state. However, of course, the reaction rate may not be sufficient to reach a thermodynamic parallel state during the preparation procedure. For example, the thicker the Me-A precursor and the lower the temperature, the less likely the coating layer may reach a thermodynamic parallel state.

Therefore, the final coating layer in the present invention may be present in a composite form of the $MeP_x$ compound and the $MeA_x$ compound. As will be described later, the $MeP_x$ compound and the $MeA_x$ compound in the present invention are distinguished from a simple mixture form. In the present invention, the compounds constituting the coating layer are physically and chemically self-bound and require no binder for binding. In the present invention, the $MeP_x$ compound and the $MeA_x$ compound may form a solid solution.

In the present invention, the metal elements (Me) of the respective compounds are the same type of metal element.

For example, as for Co, a phosphide constituting a composite coating layer may include at least one type selected from compounds including CoP, $CoP_2$, and $Co_2P$. Preferably, the phosphide may include CoP or $CoP_2$. In addition, the oxide contained in the composite coating layer may be CoO, $Co_3O_4$, or $CoO_2$. Preferably, the oxide includes $Co_3O_4$. For example, the phosphide of the composite coating layer in the present invention may include two types of $CoP_x$ phases composed of CoP and $CoP_2$. Herein, the $MoP_x$ phase composed of CoP and $CoP_2$ is chemically or physically bound to the surface of the carbon-based material together with the $MoA_x$ phase to be present in the form of a compound. Similarly, Ni, Fe, Co, V, Cr, Mn, and Nb in the present invention may form a composite of the listed phosphides, oxides, and sulfides, and description thereof is omitted.

The composite coating layer may be uniformly coated on the surface of the carbon-based material. In the present invention, the coating layer may also be locally coated on a partial surface of the carbon-based material.

The content of the phosphide, such as CoP and $CoP_2$, in the composite coating layer may be 5 wt % or more, 10 wt % or more, 20 wt % or more, 30 wt % or more, 40 wt % or more, 50 wt % or more, 60 wt % or more, 70 wt % or more, 80 wt % or more, 90 wt % or more, or 100 wt % or more. Preferably, the content of the phosphide is 50% or more.

In the present invention, the carbon-based material may employ at least one from materials composed of crystalline or amorphous carbon, such as artificial graphite, natural graphite, graphitized carbon fibers, graphitized mesocarbon microbeads, petroleum coke, resin burned bodies, carbon fibers, pyrolytic carbon, and the like. The carbon-based material preferably has a particle diameter of 20 μm.

Hereinafter, a method for preparing an anode active material of a nonaqueous lithium secondary battery according to an embodiment of the present invention will be described.

FIG. 1 is a flowchart schematically illustrating a process of preparing an anode active material for a nonaqueous lithium secondary battery, the anode active material having a functional coating layer containing metal phosphide particles, such as MoP, $MoP_2$, CoP, or $CoP_2$, according to an embodiment of the present invention.

Referring to FIG. 1, a carbon-based material, a $MeA_x$ precursor, and a material, such as a precursor containing phosphorus (P) for forming a metal phosphide ($MeP_x$) are prepared. In the present invention, the $MeA_x$ precursor may be a mixture of Me and A or a Me-A compound.

In the present invention, the $MeA_x$ precursor may employ an oxide or a phosphide listed on Table 1. For example, $Co_3O_4$, which is an oxide, and $NiS_2$, which is a nickel sulfide. The present invention is not limited thereto, and various precursors, such as $(NH_4)_6Mo_7O_{24}\cdot4H_2O$, may be used.

According to a preferable embodiment of the present invention, Me contained in the $MeA_x$ precursor may act as a metal source of a phosphide. That is, the $MeA_x$ precursor reacts with the P precursor to form a $MeP_x$ compound.

In the present invention, various forms of precursors containing phosphorus (P) may be used as P precursors. For example, sodium hypophosphite ($NaH_2PO_2$), phosphoric acid ($H_3PO_4$), or phosphorous trichloride ($PCl_3$) may be used as a liquid source or a solid source. As a gas source, sodium hypophosphite ($NaH_2PO_2$), phosphorous, red (P), phosphorous, black (P), or triphenyl phosphine ($C_{18}H_{15}P$) may be used. One or more types of these sources may be used in combination.

Besides, various sources may be used, such as (R)-1,1'-binaphthyl phosphorochloridate, (S)-1,1'-binaphthyl phosphorochloridate, bis(3,5-di-tert-butyl-4-methoxyphenyl)chlorophosphine, bis(3,5-di-tert-butyl-4-methoxyphenyl)phosphine, bis(diisopropylamino)chlorophosphine, bis(3,5-di(trifluoromethyl)phenyl)phosphine, bis(2-isopropoxyphenyl)chlorophosphine, bis(2-isopropoxyphenyl)phosphine, bis(2-methoxyphenyl)chlorophosphine, bis(4-methoxyphenyl)chlorophosphine, bis(4-methoxyphenyl)phosphine, bis(2,4,6-trimethylphenyl)phosphine, bis(2,4,6-trimethylphenyl)phosphorus chloride, borane diphenylphosphine complex, tert-butyldichlorophosphine, tert-butyldimethylphosphine borane, tert-butylphosphonic dichloride, 2-chloro-1,3,2-benzodioxaphosphorin-4-one, chlorodi(o-tolyl)phosphine, di(1-adamantyl)chlorophosphine, 5,5-dimethyl-1,3,2-dioxaphosphorinan-2-one, diphenylphosphine oxide, 3-(diphenylphosphino)propionic acid, di(o-tolyl)phosphine Iodo[4,5-bis(diphenylphosphino)-9,9-dimethylxanthene]copper(I), o-phenylene phosphorochloridite, phenyl N-phenylphosphoramidochloridate, and (2,4,6-tri-tert-butylphenyl)phosphine.

In the present invention, the carbon-based material preferably has an average particle size (particle diameter) of 20 μm or less. Various materials may be used as carbon-based materials, but a graphite-based material is preferably used considering the formation of a composite coating layer containing a metal phosphide, such as CoP or $CoP_2$.

Hereinafter, a method for forming a $MeP_x$ coating layer by using a carbon-based material, a $MeA_x$ precursor, and a P precursor, which have been described above, and specifically, a method for forming a $CoP_x$ coating layer by using Co as a metal element, will be described.

Referring to FIG. 1, for example, $Co_3O_4$ as a precursor containing Co is dissolved in a mixture solvent composed of $H_2O_2$ and $HNO_3$ (S110) to prepare a $MeA_x$ precursor solution (S120). In this situation, $H_2O_2$ and $HNO_3$ are mixed at a volume ratio of 1:1, and then $Co_3O_4$ is dissolved at a weight ratio of 2 wt % relative to graphite in the prepared mixture solution to prepare a precursor solution.

Then, a carbon-based material and the coating solution are stirred to conduct coating on the surface of the carbon-based material. The stirring may be conducted at a temperature of, for example, 50-85° C. Then, the coated carbon-based material is dried (S130). The drying may be conducted at room temperature to a temperature of 100° C., and for example, the drying may be conducted at 100° C. for 12 hours.

Next, a precursor containing P is supplied to the dried carbon-based material to form a $MeP_x$ coating layer on the surface of the carbon-based material. At least a portion or the entire portion of the $MeP_x$ coating layer is converted into a phosphide, such as $MeP_x$, by a reaction of the $MeA_x$ precursor and the P precursor.

For example, the P precursor may be provided by each of the following processes.

<Process 1>

A P precursor (e.g., $NaH_2PO_4$) is inserted into a first heat treatment furnace, and a graphite powder coated with a $MeA_x$ precursor is inserted into a second heat treatment furnace. The first and second heat treatment furnaces thus set are connected to attain gas communication therebetween, and the P precursor in the first heat treatment furnace is heated at a high temperature (e.g., 300° C.) to supply a gas-phase P source to the second heat treatment furnace. In the second heat treatment furnace, heat treatment is conducted at, for example, 800° C. to induce a reaction in which the $MeA_x$ precursor is converted into $MeP_x$. In the heat treatment processes, the heat treatment is conducted in an inert gas atmosphere by continuously allowing gas, for example, argon gas, to flow.

<Process 2>

A P precursor ($NaH_2PO_4$) is mixed with a graphite powder coated with a $MeA_x$ precursor. The mixing may be conducted in a mortar mix. The mixed powder is inserted into a heat treatment furnace, and subjected to heat treatment at, for example, 800° C. In this situation, argon gas is allowed to continuously flow while the heat treatment is conducted. The heat-treated powder is washed using distilled water. The washed powder is filtered and then dried at a temperature of 70° C. for 12 hours.

For example, the $CoP_x$ coating layer in the present invention may be formed by heat treatment in an inert gas atmosphere of 500-1000° C. for 1-10 hours, and for example, the heat treatment may be performed in an argon atmosphere of 800° C. for 3 hours.

In the present invention, Me contained in the $MeA_x$ precursor acts as a source of the $MeP_x$ compound. In cases where a $Co_3O_4$ precursor is used, $Co_3O_4$ is in a thermodynamically unstable state at a heat treatment temperature, and in this procedure, reacts with a P source to generate a compound, such as CoP or $CoP_2$, as a reaction product. Of course, whether unconverted $CoO_x$ remains in the coating layer compound to form a composite may depend on kinetics.

As such, in the anode active material according to the present invention, the $CoP_x$ phase, such as CoP or $CoP_2$, is formed on the surface of the carbon-based material, leading to the more stable movement of lithium ions without precipitation of lithium metal in the surface of the carbon-based material during high-rate charging.

It is not easy to introduce the $MeP_x$ compound coating layer on the surface of the carbon-based material without using a binder. If a separate binder is used, the binder will have a negative effect on a function of an anode active material. According to the present invention, a $MeP_x$ coating layer self-bound on the surface of the carbon-based material can be provided through the conversion of at least a portion of the $MeA_x$ precursor coating layer into the $MeP_x$ compound, without the introduction of a separate binder.

Furthermore, in the present invention, such a functional coating layer is introduced to improve the reactivity and structural stability of the surface of the anode active material, and thus such an anode active material, when applied as an anode active material for a nonaqueous lithium secondary battery, can suppress the precipitation of lithium metal during high-rate charging and secure high-rate charging characteristics without deterioration of lifespan characteristics.

MODE FOR CARRYING OUT THE INVENTION

Example 1: Preparation of Mo—P-Based Anode Active Materials and Manufacture of Secondary Batteries In order to evaluate lifespan characteristics and high-rate charging characteristics of a nonaqueous lithium secondary battery employing an anode active material according to an exemplary embodiment of the present invention, an anode active material was prepared and nonaqueous lithium secondary batteries using the same were manufactured. Artificial graphite having an average particle diameter of 17 μm was used as a carbon-based material. As for a comparative example, artificial graphite without a coating layer was used as an anode active material. Nonaqueous lithium secondary batteries according to examples and a comparative example are manufactured in substantially the same manner except for an anode active material, and thus a method for manufacturing a nonaqueous lithium secondary battery according to the examples will be mainly described hereinafter.

First, in order to prepare a coating layer composed of a $MoP_x$ and $MoO_x$ composite on the surface of artificial graphite among carbon-based materials, a coating solution was prepared by dissolving $MoO_3$ as a $MoO_x$ precursor at weight ratio of 2 wt % or 5 wt % in $H_2O_2$ solution.

Then, the coating solution was uniformly coated on the surface of the artificial graphite, and sufficient drying after stirring was conducted 100° C. until the solvent was evaporated. Thereafter, the dried carbon-based material was mixed with $NaH_2PO_2$, followed by heat treatment at 600° C.

As shown in Table 2, among carbon-based materials, artificial graphite having a particle diameter of 20 μm or less without a coating layer was used for Comparative Example 1-1. For Example 1-1, 2 wt % of a $MoO_3$ precursor was coated on the surface of artificial graphite, and for Example 1-2, about 5 wt % of a $MoO_3$ precursor was coated on the surface of artificial graphite.

TABLE 2

| Classification | Base material | Content of base material | Content of $MoO_3$ coating | Solvent | Drying temperature | Heat treatment temperature |
|---|---|---|---|---|---|---|
| Comparative Example 1-1 | Artificial graphite | 100 wt % | — | — | — | — |
| Example 1-1 | Artificial graphite | 98 wt % | 2 wt % | $H_2O_2$ | 100° C. | 600° C. |
| Example 1-2 | Artificial graphite | 95 wt % | 5 wt % | $H_2O_2$ | 100° C. | 600° C. |

Figure 2:
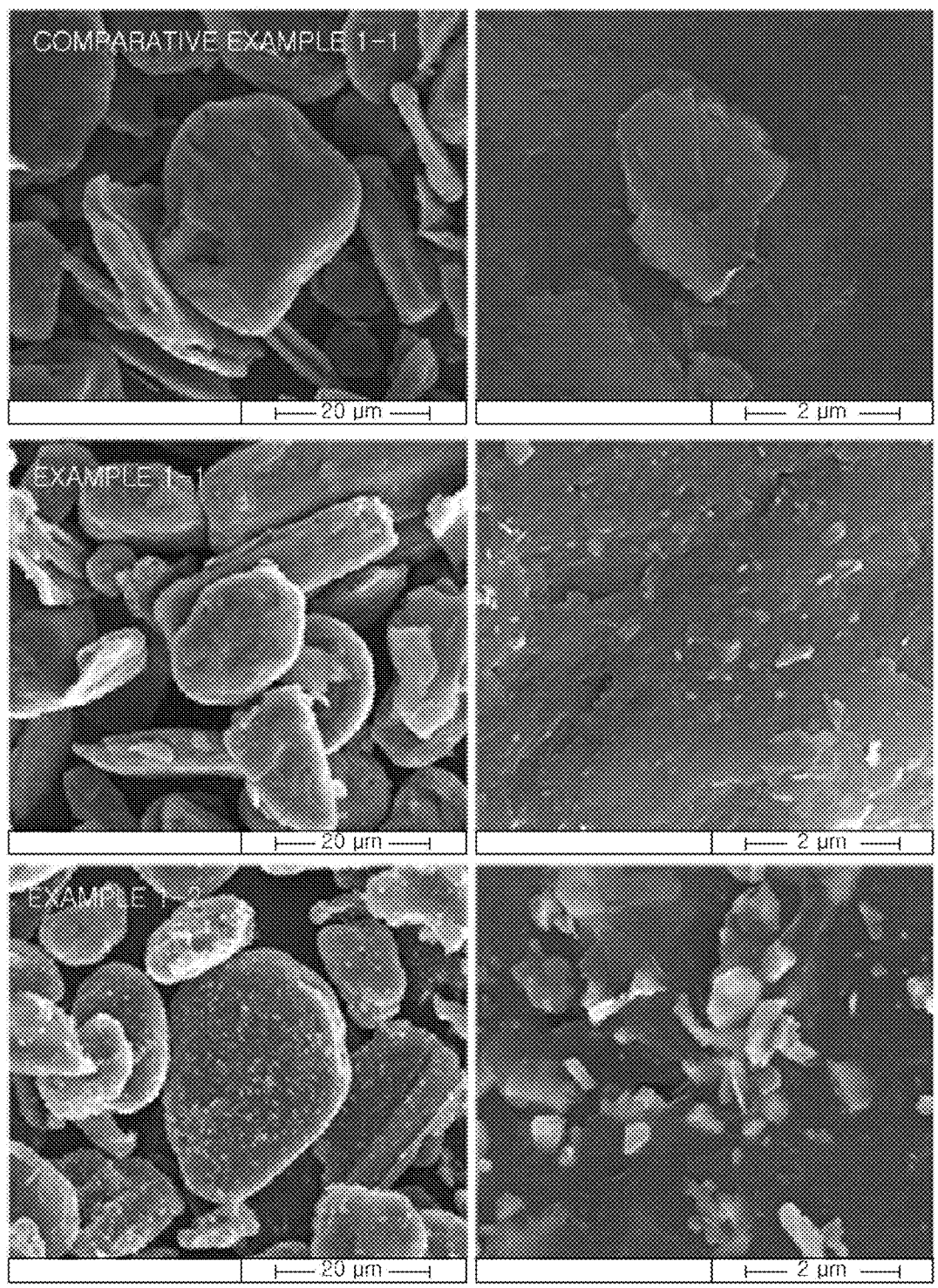
FIG. 2 illustrates images showing SEM analysis results of anode active materials prepared according to a first exemplary embodiment of the present invention.
Figure 3A:
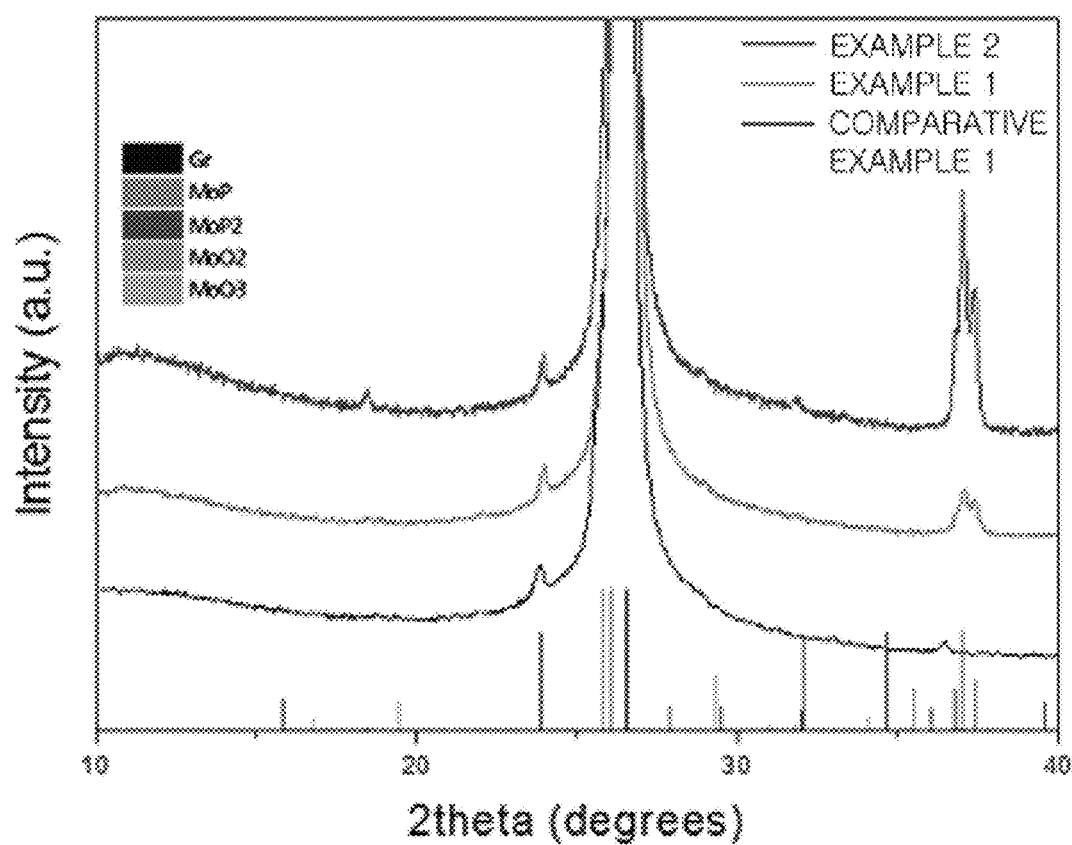
FIGS. 3A and 3B illustrate XRD patterns of anode active materials according to a first exemplary embodiment of the present invention.
Figure 3B:
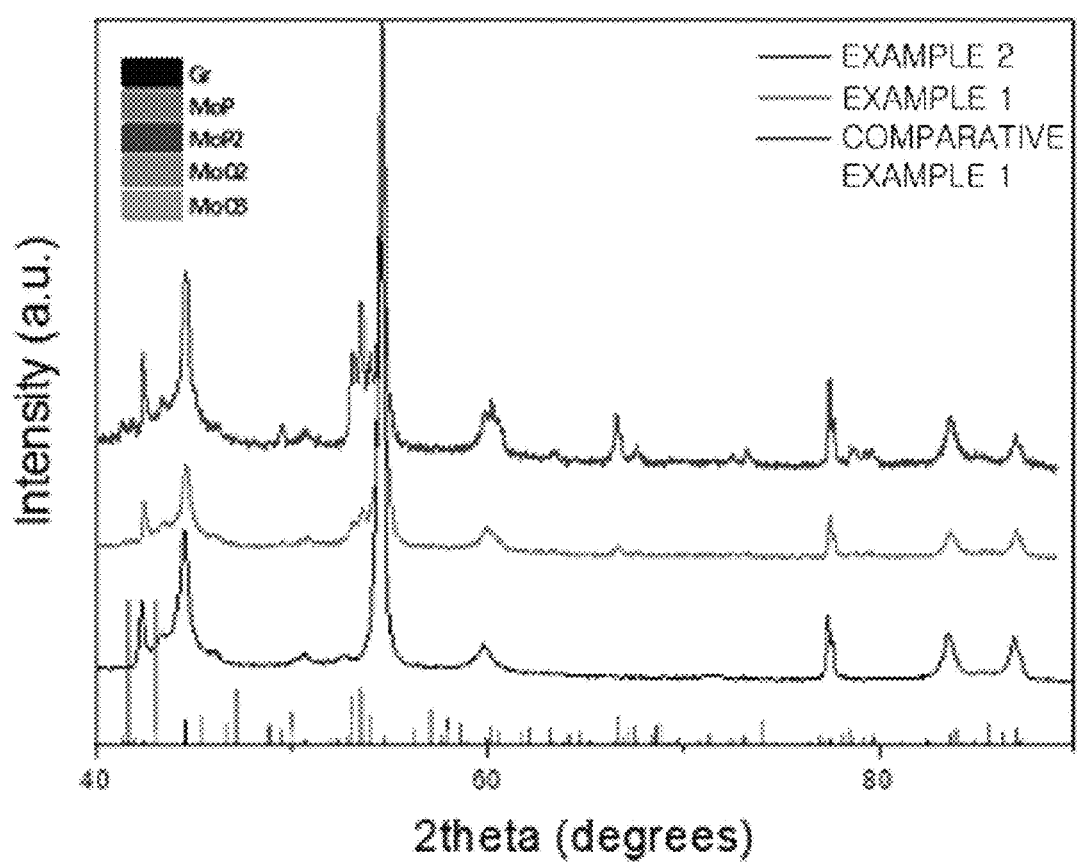

FIG. 2 illustrates scanning electron microscope images of anode active materials according to the examples of the present invention, and FIGS. 3A and 3B illustrate XRD patterns of anode active materials of the examples and the comparative example.

Referring to FIGS. 2 and 3, a coating layer containing a $MoP_x$ compound as a phosphide was formed on the surface of artificial graphite in the examples, unlike in the comparative example.

As shown in FIGS. 3A and 3B, as a result of XRD analyses, Comparative Example 1-1 and Examples 1-1 and 1-2 showed substantially different peak patterns. That is, when compared with the artificial graphite according to Comparative Example 1, patterns corresponding to MoP and $MoP_2$ were observed in the active materials prepared according to the examples of the present invention. In the examples, as summarized in the following table, corresponding peaks could be observed in the vicinity of 2θ=32.0° and 43.0°, which are characteristic peaks of MoP, and corresponding peaks can be observed in the vicinity of 23.9°, 29.5°, 41.7°, 47.2°, and 50.0°, which are characteristic peaks of $MoP_2$. Additionally, in the examples of the present invention, corresponding peaks can be observed in the vicinity of 2θ=37.0° and 53.5°, which are characteristic peaks of $MoO_2$, and corresponding peaks can be observed in the vicinity of 2θ=9.7° and 29.4°, which are characteristic peaks of $MoO_3$.

TABLE 3

| Classification | Example 1 | Example 2 |
|---|---|---|
| MoP | 31.91° | 31.93° |
|  | 43.15° | 43.15° |
| $MoP_2$ | 23.84° | 23.94° |
|  | 29.41° | 29.47° |
|  | 41.66° | 41.74° |
|  | 47.19° | 47.27° |
|  | 50.04° | 50.02° |
| $MoO_2$ | 37.0 | 37.0 |
|  | 53.6 | 53.5 |
| $MoO_3$ | 9.6 | 9.7 |
|  | 29.2 | 29.2 |

Meanwhile, the other properties than the above phase analysis results, such as the formation of impurities or changes in average particle diameter and specific surface area, were insignificant between the examples and the comparative example.

Figure 4:
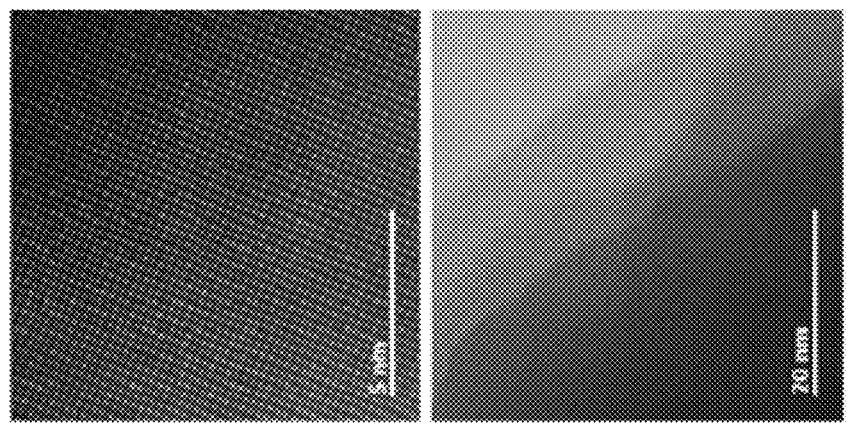
FIG. 4 illustrates images of TEM analysis of the anode active material according to a first exemplary embodiment of the present invention.
Figure 4:
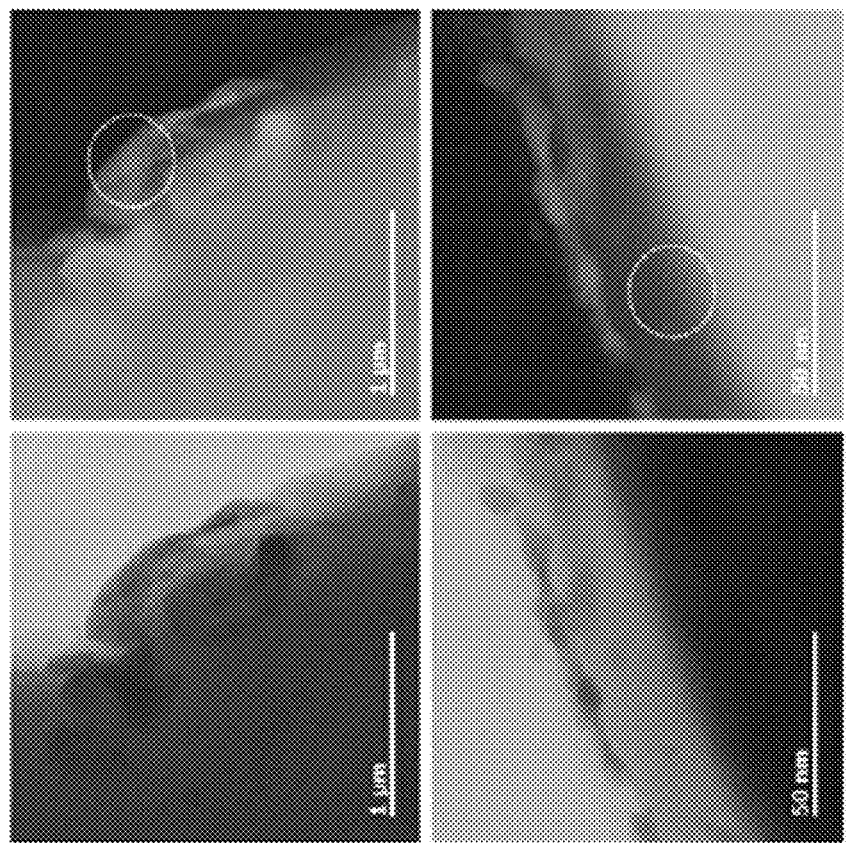
Figure 5:
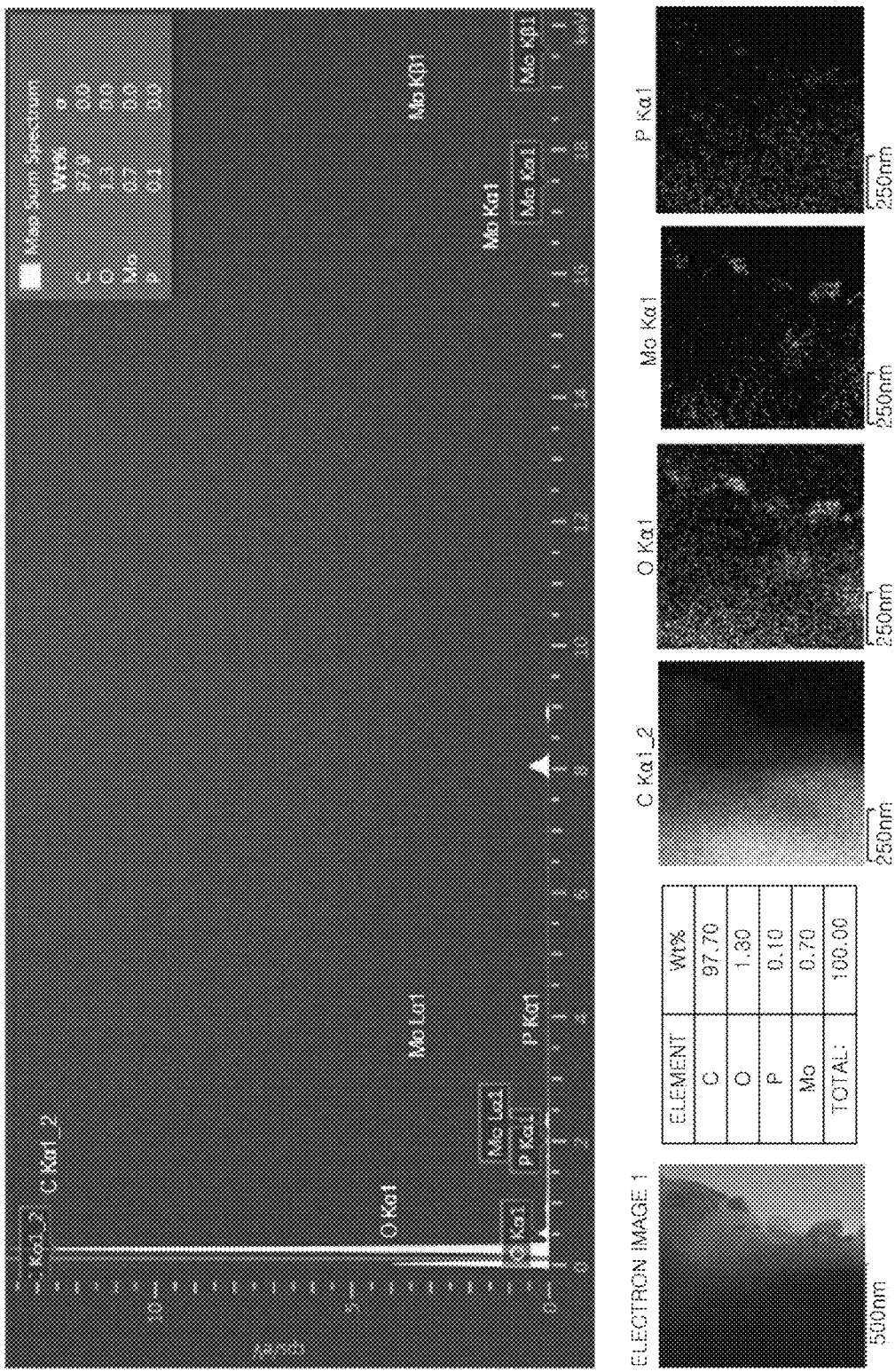
FIG. 5 illustrates images of EDS analysis of the anode active material according to a first exemplary embodiment of the present invention.

As described above, in the present examples, the $MoO_3$ precursor and the P precursor were coated on the surface of artificial graphite, thereby obtaining a coating layer containing MoP and $MoP_2$ as MoP compounds and composites thereof with $MoO_x$ compounds. This can be confirmed through transmission electron microscope (TEM) and energy dispersive spectroscopy (EDS) analysis results in FIG. 4. FIGS. 4 and 5 illustrate transmission electron microscope (TEM) images and energy dispersive spectroscopy (EDS) analysis images of anode active materials according to Example 1 of the present invention, respectively, and confirming that $MoO_x$ coating layer containing MoP and $MoP_2$ particles was formed on the surface of artificial graphite. This indicates that MoP and $MoP_2$ were physically or chemically bound with $MoO_x$ in the surface of artificial graphite.

The anode active materials thus prepared were used to manufacture nonaqueous lithium secondary batteries.

First, a slurry was prepared using 96 wt % of an anode active material, 4 wt % of polyvinylidene fluoride (PVDF) as a binder, and N-methyl-2-pyrrolidone (NMP) as a solvent. The slurry was coated on a copper foil and dried, thereby manufacturing an electrode. In this situation, the loading level and the mixture density of the electrode were 5 mg/cm$^2$ and 1.5 g/cc, respectively. Electrochemical characteristics were evaluated after a half cell was manufactured using a lithium metal counter electrode, and 1 M $LiPF_6$ in EC/EMC was used as an electrolyte.

Figure 6A:
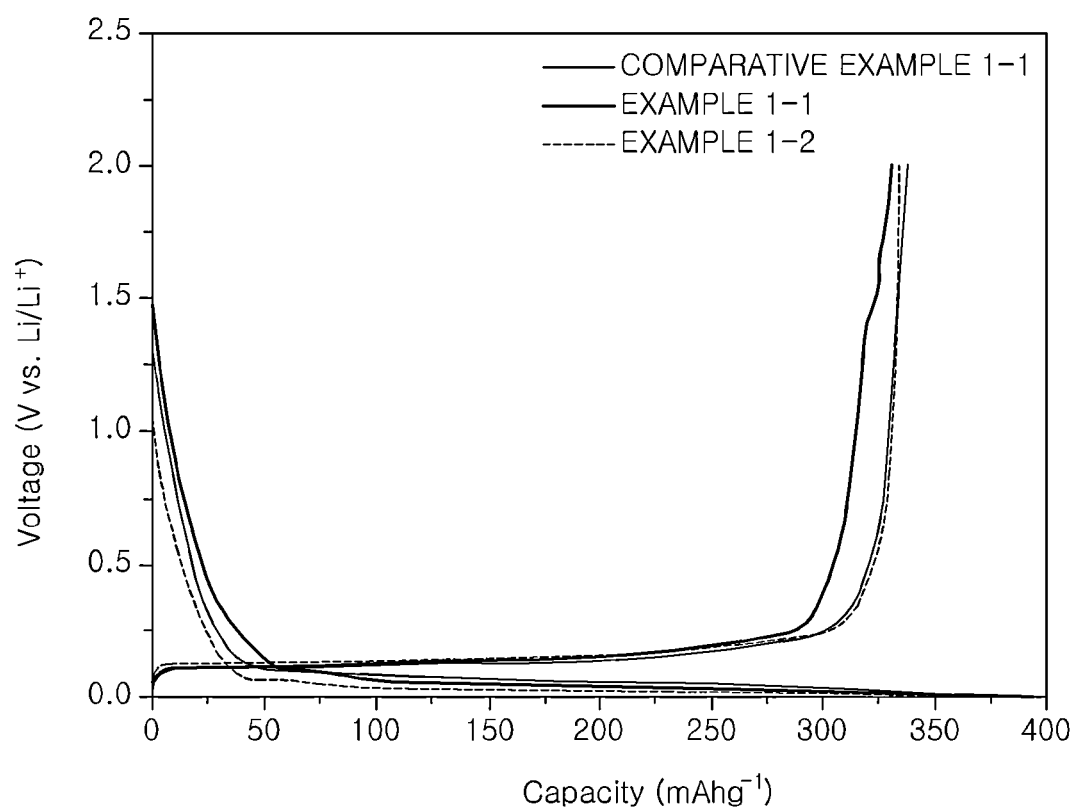

The results of evaluating the charge and discharge characteristics of the nonaqueous lithium secondary batteries according to the examples and comparative example of the present invention are shown in FIGS. 6A and 6B. FIGS. 6A and 6B illustrate graphs showing rate-specific charging characteristics of nonaqueous lithium secondary batteries using the anode active materials according to the examples and the comparative example of the present invention.

For the lifespan evaluation of the comparative example and the examples, charging and discharging was performed three times with a constant current of 0.2 C (70 mA/g) in the 0.01-2.0 V vs. Li/Li+ potential region, and the results are shown in FIGS. 6A and 6B. FIG. 6B is an enlarged view of the initial section in FIG. 6A.

Referring to FIGS. 6A and 6B, Examples 1-1 and 1-2 with $MoO_x$ coating layer containing MoP and $MoP_2$ particles showed improved charging capacity compared with Comparative Example 1-1. It is considered that the introduction of the $MoO_x$ coating layer containing MoP composed of MoP and $MoP_2$ into the surface of artificial graphite effectively reduces the resistance during the intercalation of lithium ions into the surface of artificial graphite and induces more stable movement of lithium ions during high-rate charging, thereby improving high-rate charging characteristics. However, it was confirmed through the comparison of Examples 1 and 2 that the more the amount of the $MoO_x$ coating layer containing MoP composed of MoP and $MoP_2$, the larger the reversible capacity reduction due to a decrease in the content of graphite.

Figure 7A:
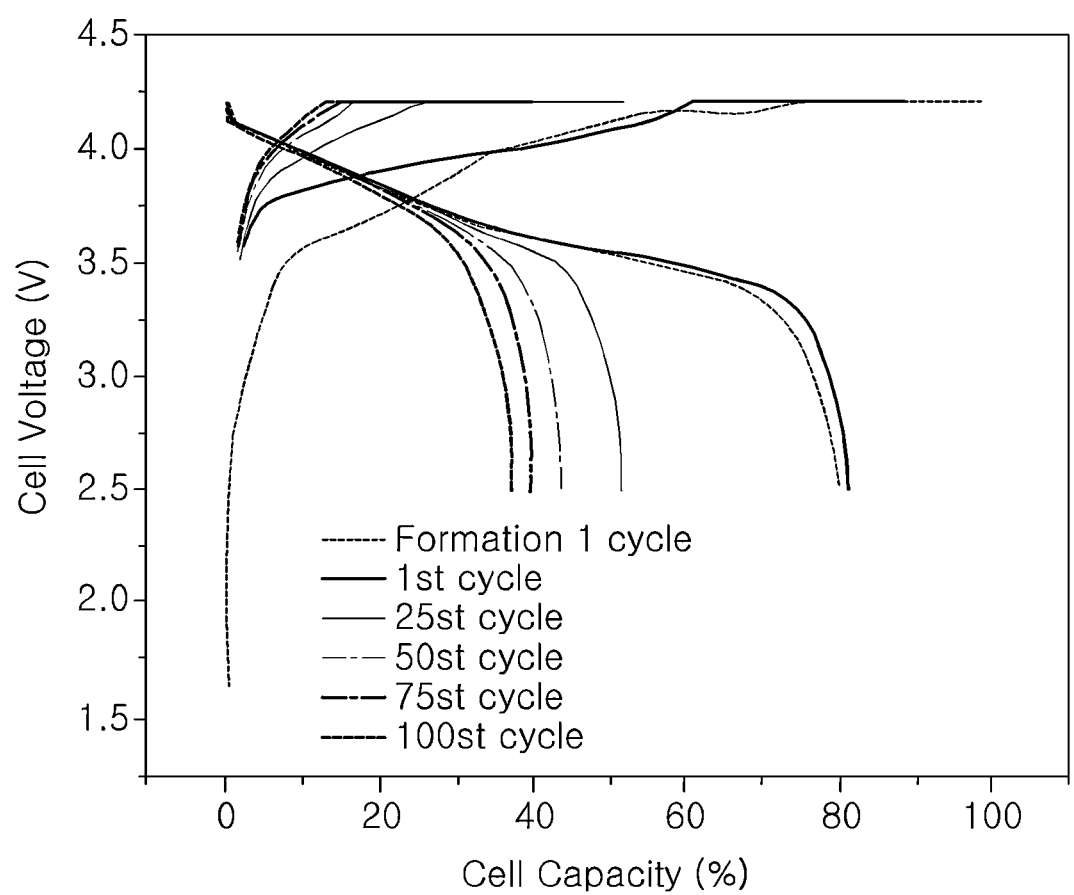
FIGS. 7A, 7B and 7C illustrate graphs comparing full cell charge and discharge characteristics of nonaqueous lithium secondary batteries using the anode active materials according to a first exemplary embodiment of the present invention.
Figure 7B:
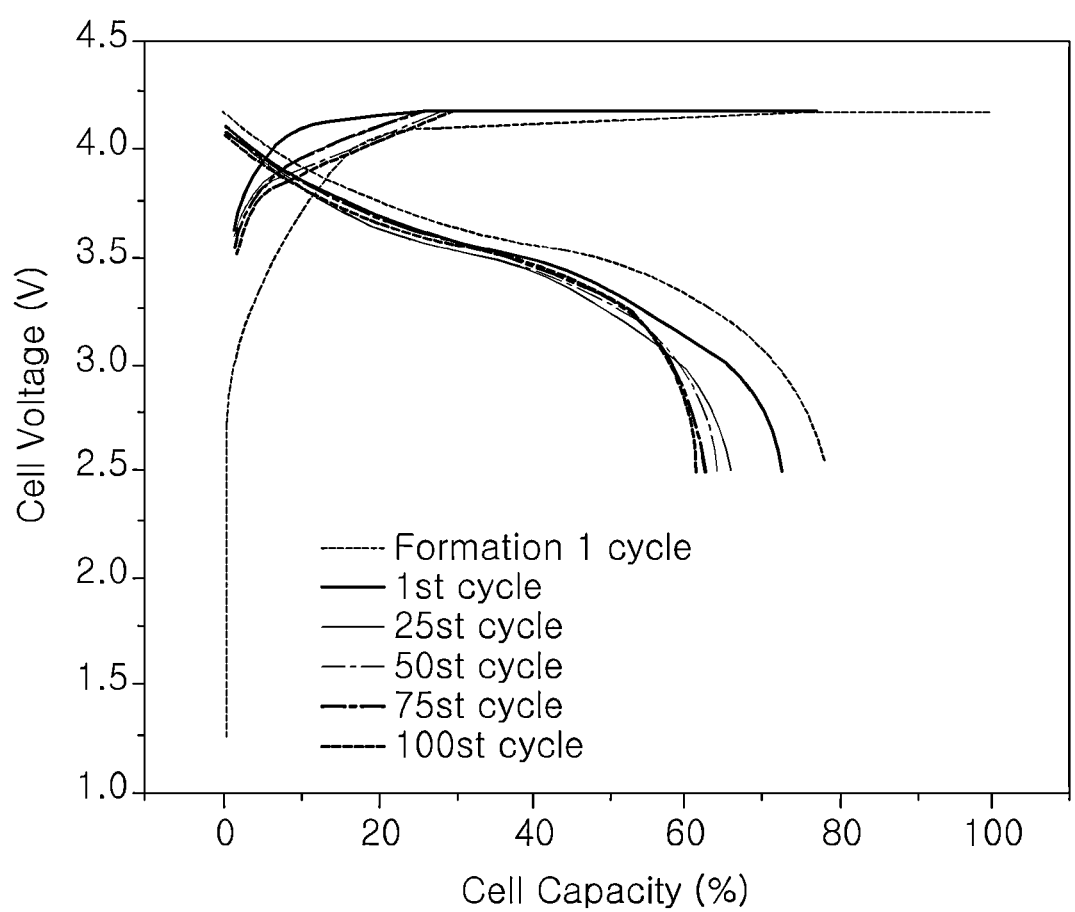
Figure 7C:
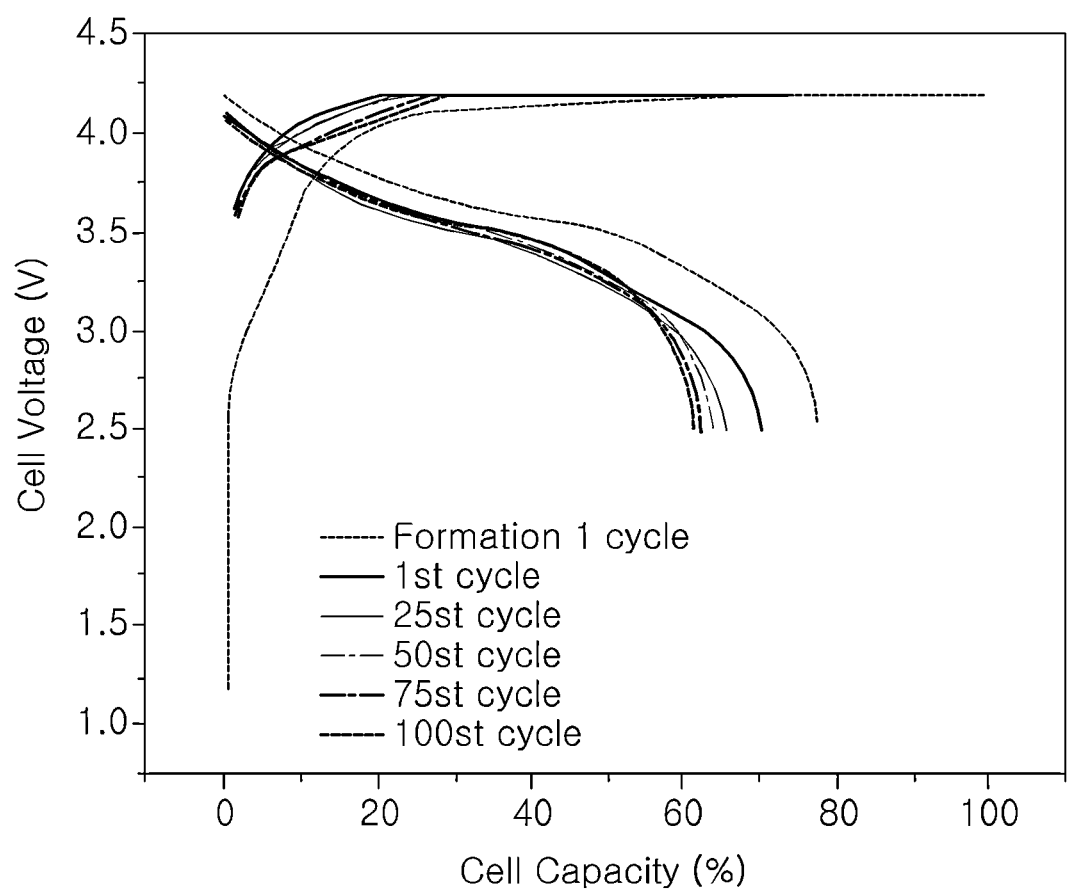
Figure 8:
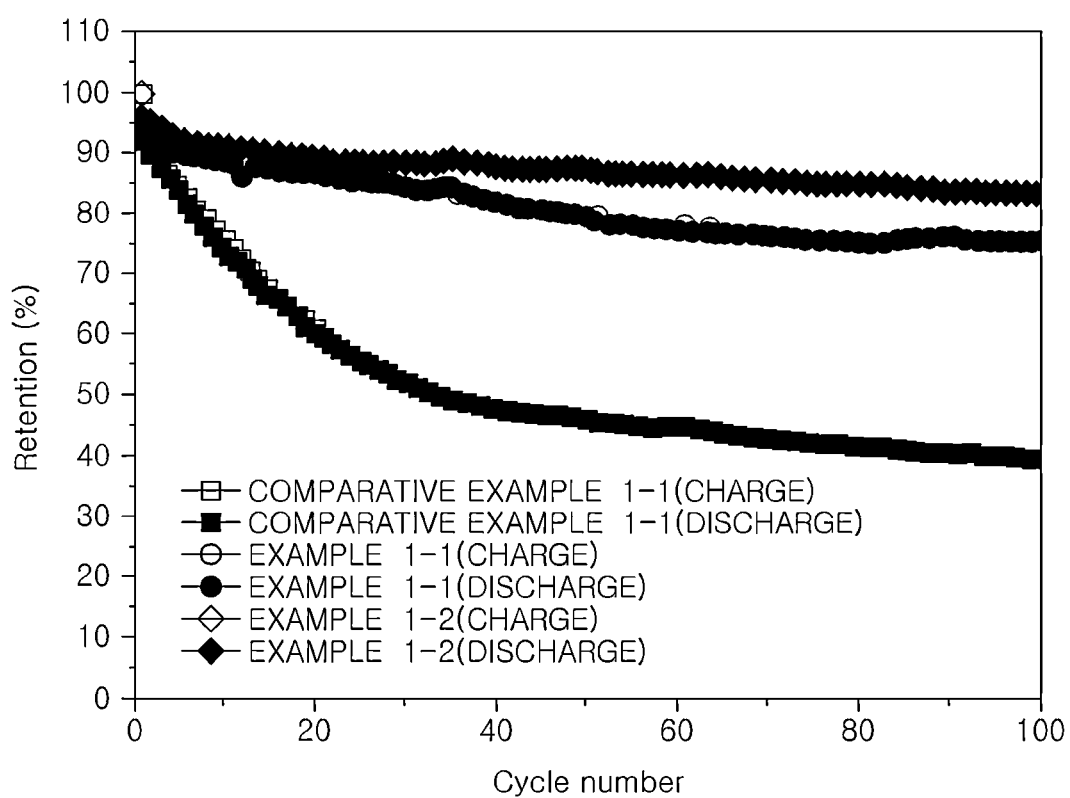
FIG. 8 illustrates graphs showing full cell lifespan characteristics of nonaqueous lithium secondary batteries using the anode active materials according to a first exemplary embodiment of the present invention.

The results of evaluating the full cell lifespan characteristics of the nonaqueous lithium secondary batteries according to the examples and the comparative example are shown in FIGS. 7A to 7C. FIG. 7A shows the result for Comparative Example 1-1, FIG. 7B is the result for Example 1-1, and FIG. 7C is the result for Example 1-2. The NCM622 material was used as cathodes. Comparative Example 1-1 and Examples 1-1 and 1-2 were manufactured as counter anodes, and charging and discharging was performed three times with a constant current of 0.2 C (70 mA/g) in a 2.5 to 4.3 V vs. Li/Li+ potential region. Thereafter, charging with a constant current of 6 C (2100 mA/g) and then discharging with a constant current of 1 C (350 mA/g) were performed 100 times, and the results are shown in FIG. 7. FIG. 8 illustrates graphs comparing full cell lifespan characteristics of nonaqueous lithium secondary batteries using the anode active materials according to the examples and the comparative example of the present invention.

Figure 9:
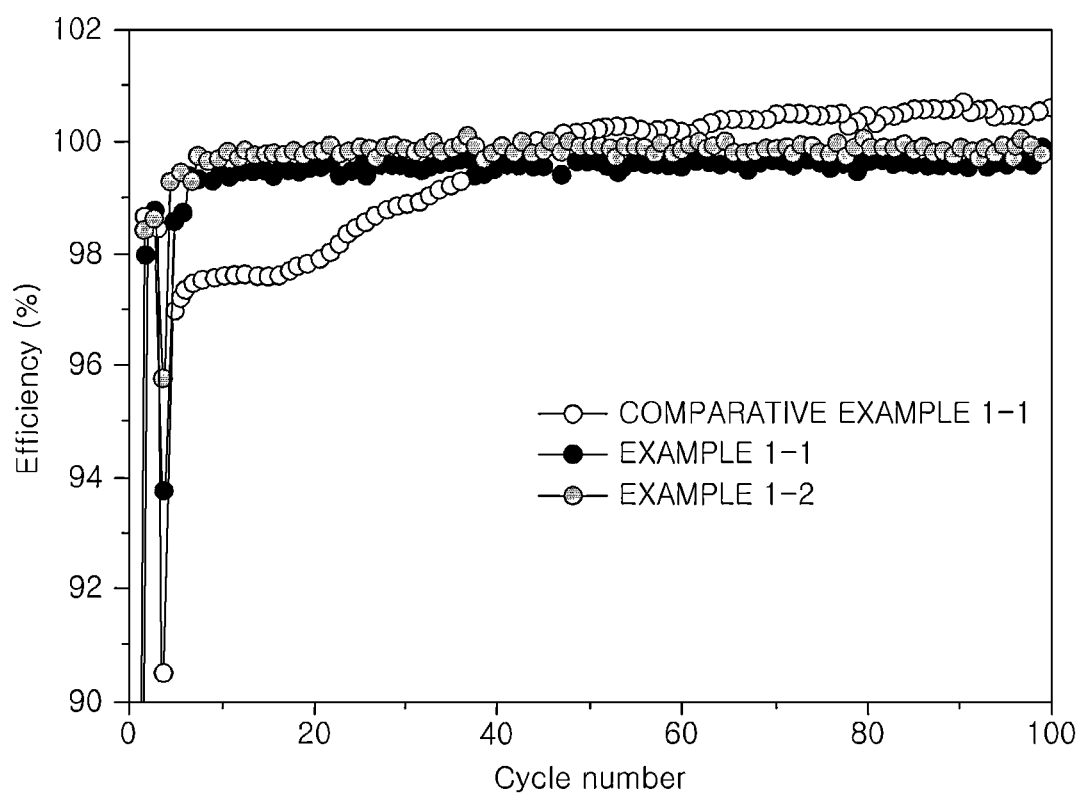
FIG. 9 illustrates graphs showing full cell charging and discharging efficiency characteristics of nonaqueous lithium secondary batteries using the anode active materials according to a first exemplary embodiment of the present invention.

Referring to FIGS. 7 and 8, Examples 1-1 and 1-2 showed relatively excellent capacity retention rates during high-rate charging and discharging, and the charging and discharging efficiency results shown in FIG. 9 also show improved characteristics. This means that the introduction of a $MoO_x$ coating layer containing MoP composed of MoP and $MoP_2$ improves high-rate charging characteristics.

Example 2: Preparation of Co—P-Based Anode Active Materials and Manufacture of Secondary Batteries A coating solution was prepared by dissolving $Co_3O_4$ as a $CoO_x$ precursor at weight ratio of 2 wt % in nitric acid.

Then, artificial graphite was placed in the coating solution, followed by stirring for 12 hours, and then stirring was conducted with application of heat until the solvent was completely evaporated, and then drying was conducted at 100° C. in an oven for 12 hours.

The Co—P coated graphite powders were prepared by process 1 (gas-phase reaction) and process 2 (solid-phase reaction), respectively.

(Process 1)

$NaH_2PO_4$ as a P precursor was set in a first heat treatment furnace, and a graphite powder coated with a $CoO_x$ precursor was set in a second heat treatment furnace. The first and second heat treatment furnaces thus set are allowed communicate with each other as a gas passage, and the first heat treatment furnace was maintained at 300° C. and the second heat treatment furnace was maintained at 800° C. In this situation, argon gas was allowed to continuously flow during heat treatment.

(Process 2)

A graphite powder coated with a $CoO_x$ precursor was mixed with $NaH_2PO_4$ as a P precursor in a mortar. The thus mixed powder was set in a heat treatment furnace, and subjected to heat treatment at 800° C. In this situation, argon gas was allowed to continuously flow while the heat treatment was conducted. Then, the heat-treated powder was washed using distilled water, and the washed powder was filtered and then dried at a temperature of 70° C. for 12 hours.

Figure 10:
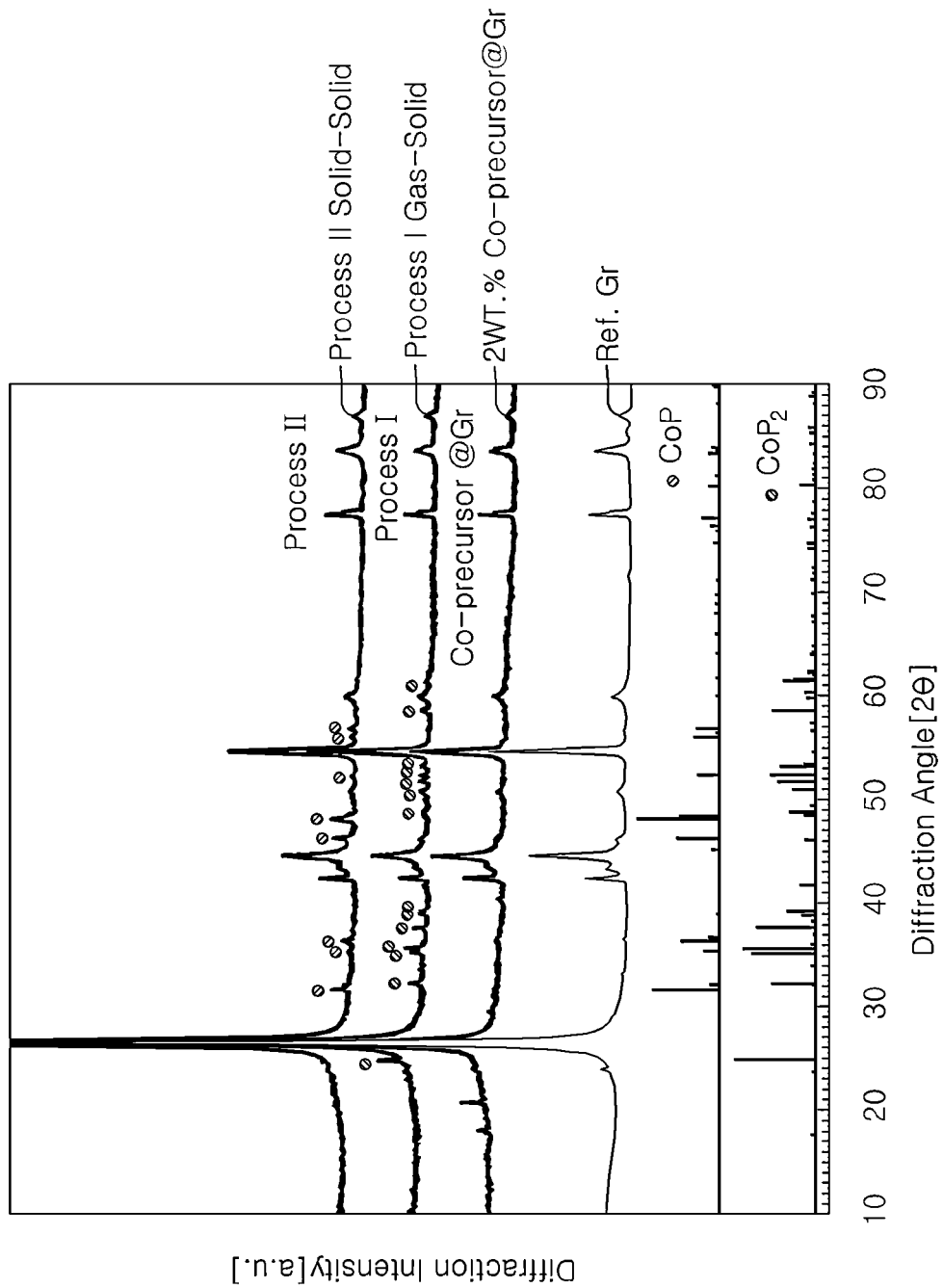
FIG. 10 illustrates XRD analysis results of Co—P-coated graphite powders prepared according to a second exemplary embodiment of the present invention.

FIG. 10 illustrates XRD analysis results of Co—P-coated graphite powders manufactured by Process 1 and Process 2.

Referring to FIG. 10, strong $CoP_2$ peaks were observed in the surface of the powder subjected to Process 1, and most of the Co—P compounds were present as a CoP2 phase. However, CoP was present as a main phase in the surface of the graphite powder subjected to Process 2, and $CoP_2$ was hardly observed. These results show that a desired phosphide state can be controlled by a reaction mechanism. As shown in FIG. 10, no oxide peak was observed in the final coating layer. This shows that the unreacted $CoO_x$ phase is hardly present under heat treatment at approximately 800° C.

An anode was prepared with a composition of anode active material prepared according to each of Processes 1 and 2/PVDF=96/4 (wt %). A cathode was prepared with a composition of NCM622/SPB/PVDF=95/2.5/2.5 (wt %). The electrodes thus prepared were applied to manufacture a 2032 coin type cell. In the half-cell, lithium metal was used as a counter electrode instead of the cathode. In this situation, the loading level of the anode was set to 2.2 mAh/cm$^2$ and the mixture density of the anode was set to a range of 1.5-1.6 g/cc.

The evaluation conditions of charge and discharge characteristics of the manufactured cells were as follows.

Initialization of half-cell: charge—0.2 C, CC/CV to 0.02 C, 0.005 V cut off//discharge—0.2 C, CC, 1.5 V cut off Initialization of full cell: charge—0.2 C, CC/CV to 0.02 C, 4.2 V cut off//discharge—0.2 C, CC, 2.5 V cut off long-term lifespan of full cell: charge—6 C, CC/CV to 0.01 C, 4.2 V cut off//discharge—1 C, CC, 2.5 V cut off

Example 3: Preparation of Fe—P-Based Anode Active Material and Manufacture of Secondary Battery A coating solution was prepared by dissolving $Fe_3O_4$ as a $FeO_x$ precursor at weight ratio of 2 wt % in nitric acid.

Then, artificial graphite was placed in the coating solution, followed by stirring for 12 hours, and then stirring was conducted with application of heat until the solvent was completely evaporated, and then drying was conducted at 100° C. in an oven for 12 hours, thereby preparing a $FeO_x$ precursor-coated graphite powder.

A Fe—P-coated graphite powder was prepared by the following solid-phase reaction process. First, a graphite powder coated with a $FeO_x$ precursor was mixed with $NaH_2PO_4$ as a P precursor in a mortar. The thus mixed powder was set in a heat treatment furnace, and subjected to heat treatment at 800° C. In this situation, argon gas was allowed to continuously flow while the heat treatment was conducted. Then, the heat-treated powder was washed using distilled water, and the washed powder was filtered and then dried at a temperature of 70° C. for 12 hours.

Figure 11:
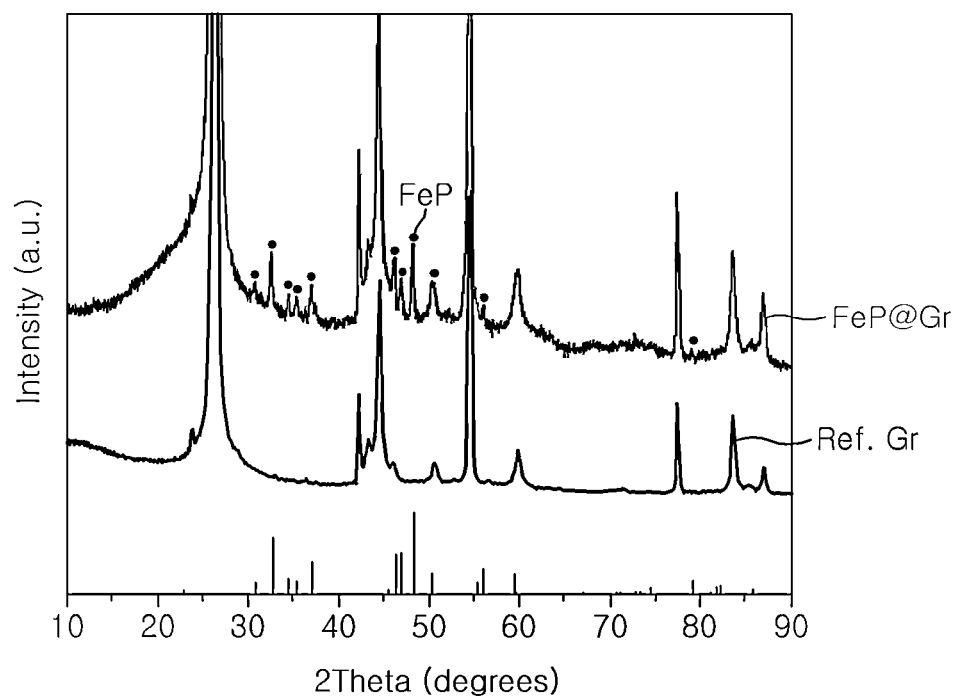
FIG. 11 illustrates XRD analysis results of a Fe—P-coated graphite powder prepared according to a third exemplary embodiment of the present invention.

FIG. 11 illustrates XRD analysis results of the prepared Fe—P-coated graphite powder.

FIG. 11 shows that most of the Fe—P compounds were present as a FeP phase. In addition, no oxide peak was observed in the final coating layer.

An anode was prepared with a composition of prepared anode active material/PVDF=96/4 (wt %). A cathode was prepared with a composition of NCM622/SPB/PVDF=95/2.5/2.5 (wt %). The electrodes thus prepared were applied to manufacture the 2032-coin-type cell. In the half-cell, lithium metal was used as a counter electrode instead of the cathode. The loading level of the anode was set to 2.2 mAh/cm$^2$ and the mixture density of the anode was set to a range of 1.5-1.6 g/cc.

The charge and discharge characteristics of the cells were evaluated under the same conditions as in Example 2.

Example 4: Preparation of Ni—P-Based Anode Active Material and Manufacture of Secondary Battery A coating solution was prepared by dissolving NiO as a $NiO_x$ precursor at weight ratio of 2 wt % in nitric acid.

Then, artificial graphite was placed in the coating solution, followed by stirring for 12 hours, and then stirring was conducted with application of heat until the solvent was completely evaporated, and then drying was conducted at 100° C. in an oven for 12 hours, thereby preparing a $NiO_x$ precursor-coated graphite powder.

A Ni—P-coated graphite powder was prepared by the following solid-phase reaction process. First, a graphite powder coated with a $NiO_x$ precursor was mixed with $NaH_2PO_4$ as a P precursor in a mortar. The thus mixed powder was set in a heat treatment furnace, and subjected to heat treatment at 800° C. for 3 hours. In this situation, argon gas was allowed to continuously flow while the heat treatment was conducted. Then, the heat-treated powder was washed using distilled water, and the washed powder was filtered and then dried at a temperature of 70° C. for 12 hours.

Figure 12:
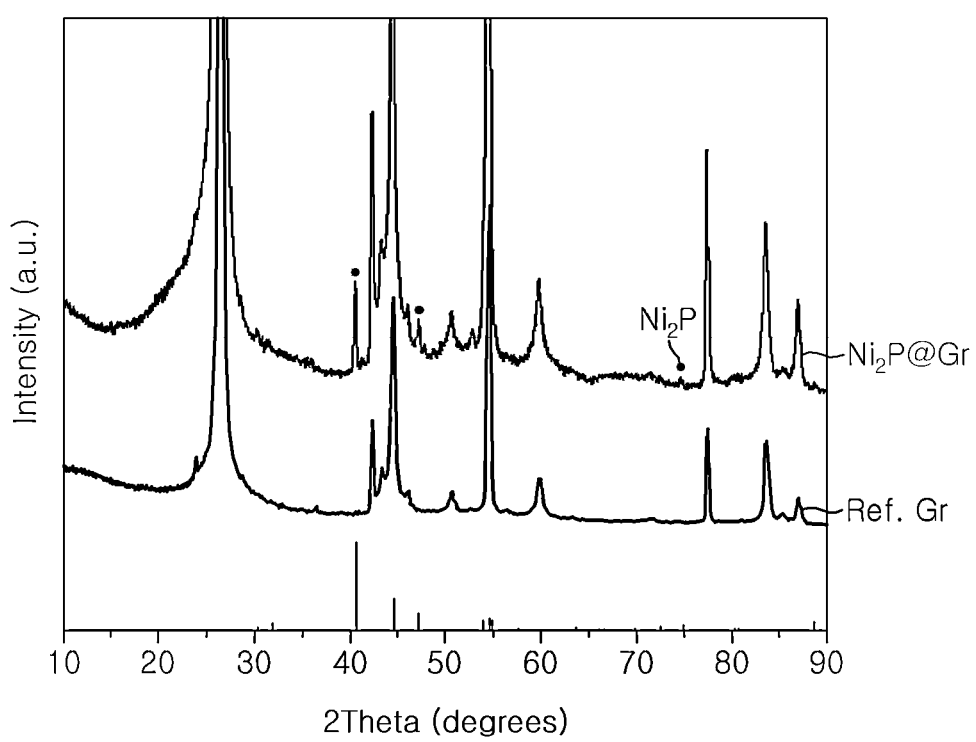
FIG. 12 illustrates XRD analysis results of a Ni—P-coated graphite powder prepared according to a fourth exemplary embodiment of the present invention.

FIG. 12 illustrates XRD analysis results of the prepared Fe—P-coated graphite powder.

FIG. 12 shows that most of the Fe—P compounds were present as a NiP2 phase. In addition, no oxide peak was observed in the final coating layer.

An anode was prepared with a composition of the prepared anode active material/PVDF=96/4 (wt %). A cathode was prepared with a composition of NCM622/SPB/PVDF=95/2.5/2.5 (wt %). The electrodes thus prepared were applied to manufacture a 2032 coin-type cell. In the half-cell, lithium metal was used as a counter electrode instead of the cathode. The loading level of the anode was set to 2.2 mAh/cm$^2$ and the mixture density of the anode was set to a range of 1.5-1.6 g/cc.

The charge and discharge characteristics of the cells were evaluated under the same conditions as in Example 2.

Figure 13:
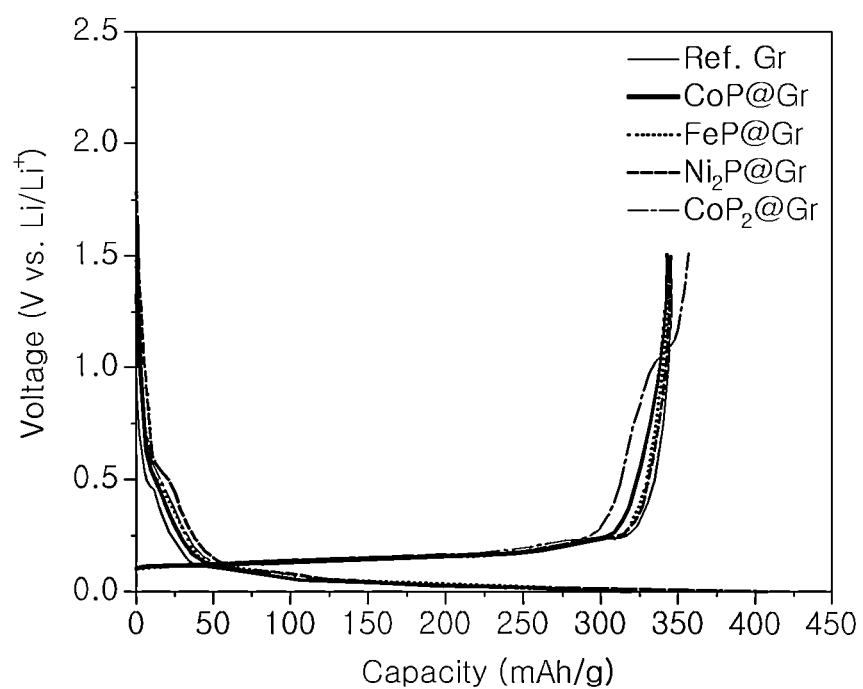
FIG. 13 illustrates a graph showing initial charge and discharge characteristics of half-cells according to Examples 2 to 4 of the present invention.

FIG. 13 illustrates a graph showing initial charge and discharge characteristics of half-cells of Examples 2 to 4, and Table 4 illustrates a table showing the summary of charge and discharge characteristics.

TABLE 4

| Classification | Charge (mAh/g) | Discharge (mAh/g) | CE (%) |
|---|---|---|---|
| Ref. Gr | 372.8 | 345.4 | 92.7 |
| CoP@Gr | 387.4 | 343.0 | 88.5 |
| FeP@Gr | 379.4 | 342.2 | 90.2 |
| Ni$_2$P@Gr | 394.6 | 344.6 | 87.3 |
| CoP$_2$2@Gr | 406.9 | 356.6 | 87.6 |

For evaluation of discharge characteristics of Comparative Examples (Ref. Gr) having graphite as an active material, Example 2 (CoP@Gr, CoP2@Gr), Example 3 (FeP@Gr), and Example 4 (NiP2@GR), charging and discharging was performed with a constant current of 0.2 C (70 mA/g) in the 0.01-1.5 V vs. Li/Li+ potential region. According to FIG. 13, after the introduction of a lithium insertion promoting material into the surface of graphite, an increase in the initial charge capacity was observed, and the change in the initial discharge amount was insignificant. This is considered to be the capacity contribution by a reversible reaction of the lithium insertion promoting material and lithium, and a side reaction due to the introduction of the lithium insertion promoting material was not observed in the shown charge and discharge curves. However, in Example 2, the CoP$_2$ and Li reaction was observed in 1.1 V vs. Li/Li+ during discharging by the CoP2 phase.

Figure 14:
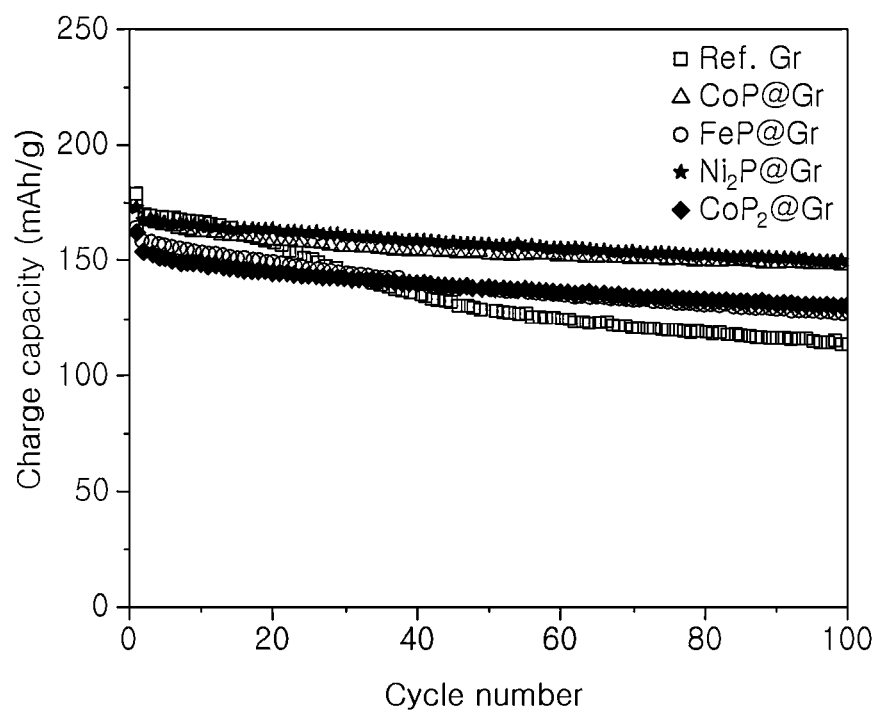
FIG. 14 illustrates a graph showing long-term lifespan characteristics of full cells according to Examples 2 to 4 of the present invention.

FIG. 14 illustrates a graph showing the results of evaluating lifespan characteristics of full cells of Examples 2 to 4.

NCM622 material was used as cathodes, and the active materials of the examples were manufactured into counter electrodes. Charging and discharging was performed three times with a constant current of 0.2 C (70 mA/g) in in a 2.5 to 4.2 V vs. Li/Li+ potential region, and thereafter, charging with a constant current of 6 C (2100 mA/g) and then discharging with a constant current of 1 C (350 mA/g) were performed 100 times. Referring to FIG. 14, after 100 cycles, the examples showed relatively superior capacity retention compared to the comparative example during high-rate charging and discharging, and this means that the high-rate charging characteristics of the full cell were improved after the introduction of various lithium insertion promoting materials into the surface of graphite.

Meanwhile, the examples described in the present specification and drawings are merely the representation of specific examples to aid the understanding, and are not intended to limit the scope of the present invention. It would be obvious to a person skilled in the art to which the present invention pertains that other modifications based on the technical spirit of the present invention in addition to the examples disclosed herein can be implemented.

INDUSTRIAL APPLICABILITY

The secondary batteries of the present invention can be applied.

What is claimed is:

1. A method for preparing an anode active material for a nonaqueous lithium secondary battery, the method comprising:
    preparing a carbon-based material;
    forming a precursor coating layer containing Me and A (A is O or S) on the surface of the carbon-based material;
    supplying a P precursor to the precursor coating layer on the carbon-based material; and
    reacting the precursor coating layer and the P precursor to convert at least a portion of the precursor coating layer into a compound represented by chemical formula $Me_{x1}P_{y1}$ (x1>0 and y1>0), thereby forming a phosphide coating layer,
    wherein Me is at least one same metal element selected from Mo, Ni, Fe, Co, Ti, V, Cr, Nb, and Mn.

2. The method of claim 1, wherein the phosphide coating layer contains a composite of a compound represented by chemical formula $Me_{x1}P_{y1}$ (x1>0 and y1>0) and a compound represented by chemical formula $Me_{x2}A_{y2}$ (A is O or S; and x2>0 and y2>0).

3. The method of claim 1, wherein in the supplying of the P precursor, the P precursor is supplied as a gas source.

4. The method of claim 1, wherein in the supplying of the P precursor, the P precursor is mixed, as a solid or liquid source, with the carbon-based material.

5. The method of claim 1, wherein the P precursor is at least one type selected from the group consisting of sodium hypophosphite ($NaH_2PO_2$), phosphoric acid ($H_3PO_4$), phosphorous trichloride ($PCl_3$), phosphorous, red (P), Phosphorous, black (P), and triphenyl phosphine ($C_{18}H_{15}P$).

6. The method of claim 1, wherein in the forming of the coating layer, heat treatment is conducted for reaction of the precursor coating layer and the P precursor.

7. The method of claim 1, wherein in the converting, P of the P precursor is substituted for A in the precursor coating layer.

8. The method of claim 1, wherein the P precursor contains no metal element Me.

9. The method of claim 1, wherein the forming of the phosphide coating layer is performed in an inert gas atmosphere at 500-1000° C. for 1-10 hours.

* * * * *